(No Model.)

W. J. WAYNE.
TWO WHEELED VEHICLE.

No. 264,498. Patented Sept. 19, 1882.

WITNESSES
Wm A. Skinkle
Jos. S. Latimer

INVENTOR
W. J. Wayne.
By his Attorney
John C. Dupee.

N. PETERS, Photo-Lithographer, Washington, D. C.

United States Patent Office.

WILLIAM J. WAYNE, OF DECATUR, ILLINOIS.

TWO-WHEELED VEHICLE.

SPECIFICATION forming part of Letters Patent No. 264,498, dated September 19, 1882.

Application filed May 19, 1882. (No model.)

*To all whom it may concern:*

Be it known that I, WILLIAM J. WAYNE, a citizen of the United States, residing at Decatur, in the county of Macon and State of Illinois, have invented a new and useful Improvement in Two-Wheel Vehicles, of which the following is a specification.

My invention relates to certain new and useful improvements in that class of two-wheel vehicles more commonly known as "road-carts;" and the objects of my improvements are to combine lightness and simplicity of construction with cheapness and durability. These objects are attained by the following-described construction, which consists, first, in the construction and arrangement of the half-elliptic spring relative to the seat-supporting bars and thills and its connection with the crank-shaped axle; second, in the manner of supporting the foot-rest from the spring above mentioned so as to allow it to pass under the crank-axle; third, in the manner of connecting the rear end of spring with axle and foot-rest; and, fourth, in the combination and arrangement of all the before-mentioned elements, as hereinafter fully described.

Figure 1:
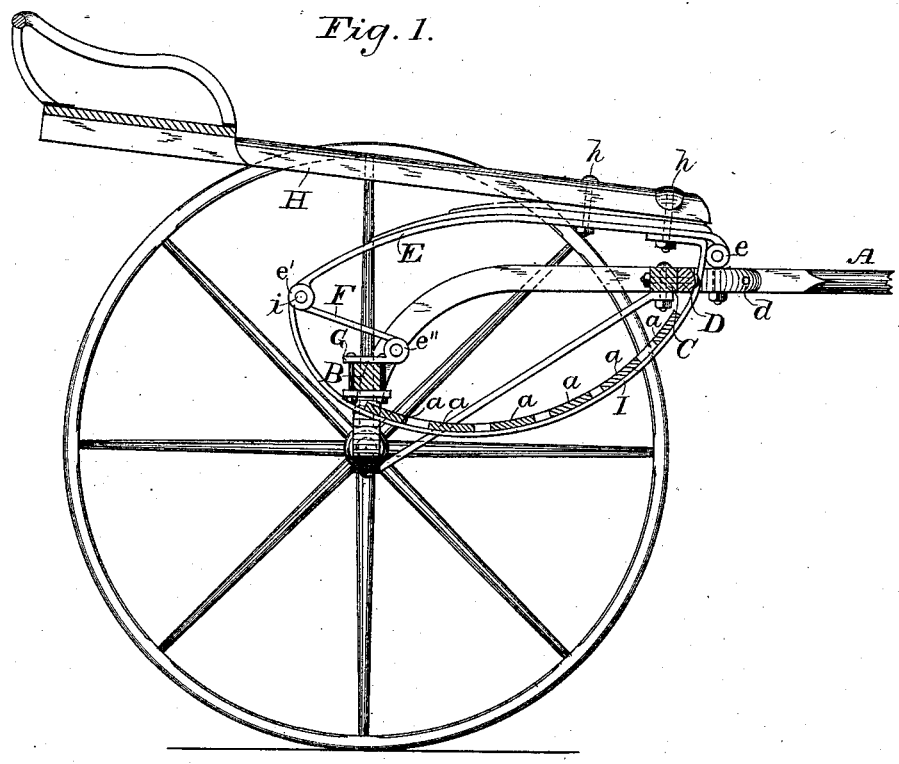
Figure 2:
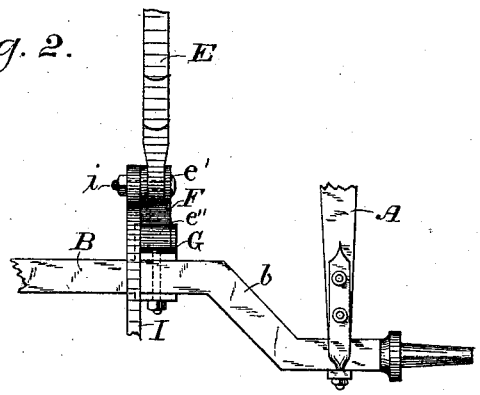

Reference being had to the accompanying drawings, forming a part of this specification, Figure 1 is a central vertical section, showing one spring, one seat-supporting bar, and one side of the foot-rest. Fig. 2 is a rear view of a part of the crank-shaped axle, showing manner of attaching the foot-rest to the rear end of the spring and the position in which the thills are united with the axle.

Similar letters refer to similar parts throughout the several views.

A represents the thills, which are connected to the lower part of the crank-shaped axle B, between the offset $b$ and the wheel, and have a large curve at their rear ends, so as to bring them nearly level when in use. Between these thills is the ordinary cross-bar, C, directly in front of which, and bolted to it in the center, is a circling bar, D, its end bolted to the thills at $d$, as shown in Fig. 1. This circling bar D serves a double purpose in connection with other elements of the device—first, as a brace to the thills in addition to the cross-bar C; and, second, in affording a more suitable connection for the fulcrum of the spring E and seat-supporting bars H, throwing them nearer together and inside of the thills, thereby affording a more convenient connection for the foot-rest I.

E represents one of the half-elliptic springs, of which there are two, one on each side, the forward end of which is secured to the circling bar D by an eyebolt, $e$. The rear end of said spring is indirectly connected with the high part of the crank-axle B by a jointed connection, F, its upper end forming a knuckle-joint, $e'$, with the spring, and its lower end forming a knuckle-joint, $e''$, with the clamping-plate G, which is secured to the axle by an under strap and bolts, or it may be otherwise secured, with its jointed end toward the front, in order to give more length to the connection F and shorten the spring, making it more compact, and still allow the spring to elongate as pressure is brought to bear upon it.

H represents one of the seat-supporting bars, which is rigidly attached to the forward part of the spring E on its upper side by the bolts $h\ h$, as shown in Fig. 1, one of which is a T-bolt, and extends down through far enough to admit of attaching the forward end of the foot-rest I to its under side, (see also Fig. 1,) the rear end of said foot-rest being secured to the rear end of the spring, in the manner shown in Fig. 2, by the extended end of the bolt $i$, that forms the knuckle-joint connection of the spring E and part F. The downward sweep or curve of the foot-rest will be governed in a measure by the distance the seat is placed back of the axle to allow the rider to assume a comfortable position; but in all cases the foot-rest should pass down under the axle, as shown in Fig. 1.

No special construction is claimed for the floor or bottom of the foot-rest bars, as it is obvious that strips or cleats of wood may be used, as shown at $a\ a\ a\ a$, Fig. 1; or it may consist of woven willow or wire, of any desired form or pattern, that being optional with the manufacturer which is used.

By reference to the drawings it will be obvious that by the above-described connection of the half-elliptic spring with the seat-supporting bars and foot-rest an equal amount of elasticity or vibration of the spring is imparted to each in accordance with the degree of weight applied to them, and that the seat has an easy oscillating movement, thus avoiding the sudden jolt and jar so objectionable in other vehicles of its class.

I am aware that seat-supporting bars connected directly to the thills and extending rearward over the axle, and having rubber springs placed between the bars and thill or cross-bar near the fulcrum, are not new. I therefore do not claim such a combination, broadly; but,

Having thus described my invention, what I believe to be new, and desire to secure by Letters Patent, is—

1. In a sulky or two-wheel vehicle, the half-elliptic springs E, in combination with the circle-bar D, jointed connections F, clamping-plate G, and axle, substantially as shown, and for the purpose described.

2. In a sulky or two-wheel vehicle, the combination, with the half-elliptic springs E, attached to the circle-bar and axle, as set forth, of the seat-supporting bars H, secured to the upper side of said springs, near their forward ends, as shown, whereby the vibrative action of the springs is imparted to the seat, substantially as specified.

3. In combination with the half-elliptic spring E, attached to the circle-bar D and axle, as set forth, of the foot-rest I, attached to the under side of said spring, near its forward end, extending downward and rearward under the crank-axle, and connecting with the rear end of the spring by bolt $i$, substantially as shown, and for the purpose described.

4. In a sulky or two-wheel vehicle, the connections F and clamping-plates G, in combination with the half-elliptic spring and axle, substantially as shown, and for the purpose specified.

5. In a two-wheel vehicle, the jointed connection F, in combination with the rear extremity of the spring and the high portion of the crank-shaped axle, said connection F forming a knuckle-joint, $e'$, with the spring and knuckle-joint $e''$ with the clamping-plate G, substantially as shown, and for the purpose specified.

6. The connection F, in combination with the springs and axle, as set forth, said connection F forming a knuckle-joint, $e'$, with the rear end of the spring, extending on an incline downward and forward, terminating at and forming a knuckle-joint, $e''$, with the clamping-plate G, secured to the axle, whereby the rear end of the springs is supported and allowed to elongate, substantially as specified.

In testimony that I claim the foregoing as my invention I hereunto set my hand in the presence of two subscribing witnesses.

WILLIAM J. WAYNE.

Witnesses:
C. L. WAGGONER,
S. F. GREER.